(No Model.)
S. ADAMS.
MACHINE FOR SWAGING OR TAPERING PIPES OR FLUES.
No. 579,214. Patented Mar. 23, 1897.
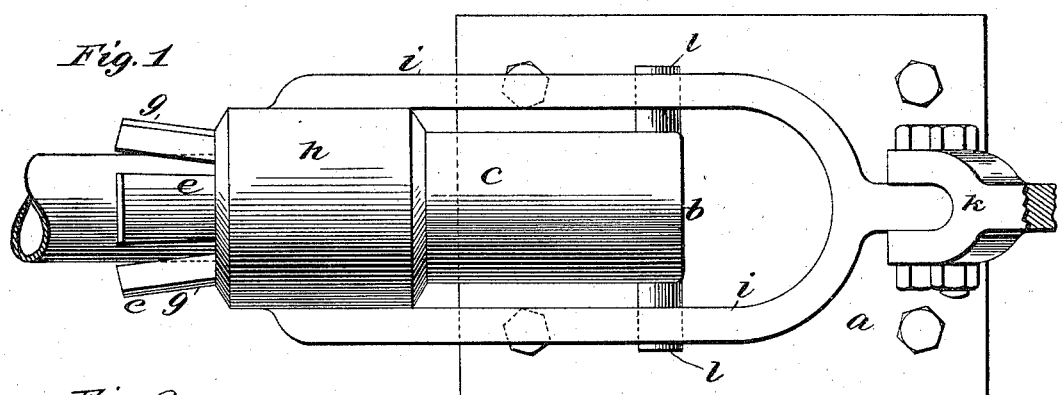
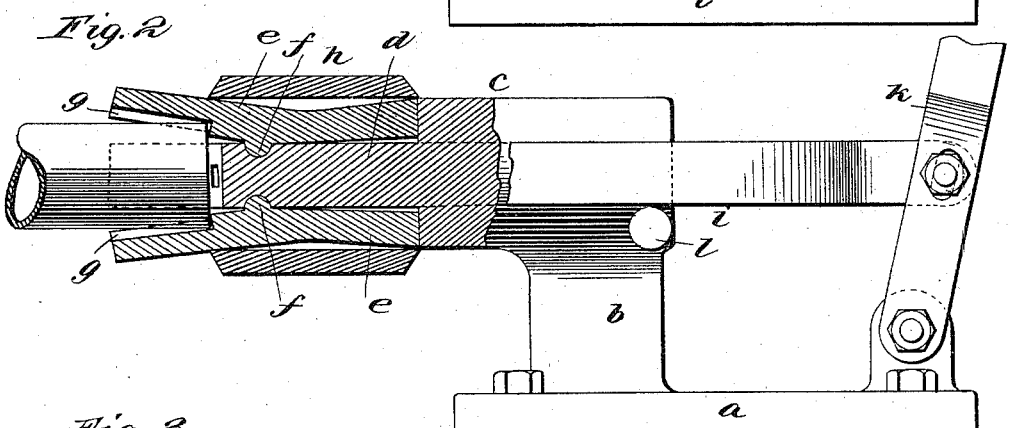
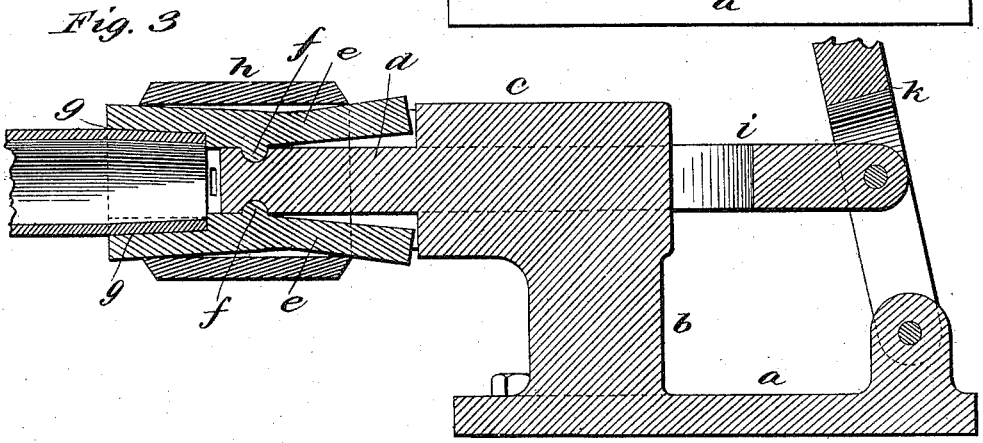
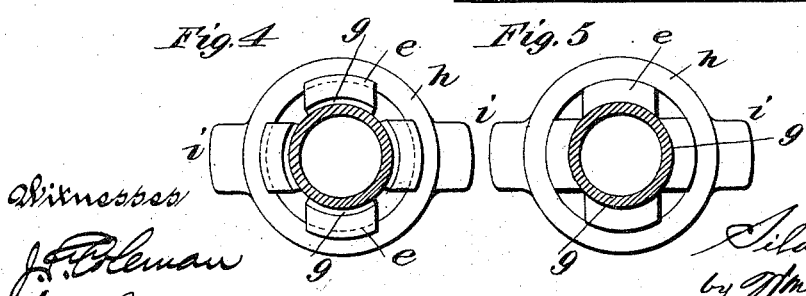
Witnesses
J. F. Coleman
Nellie Callahan
Inventor
Silas Adams,
by Wm. N. Finckel
Attys.

UNITED STATES PATENT OFFICE.

SILAS ADAMS, OF ALTOONA, PENNSYLVANIA.

MACHINE FOR SWAGING OR TAPERING PIPES OR FLUES.

SPECIFICATION forming part of Letters Patent No. 579,214, dated March 23, 1897.

Application filed July 16, 1896. Serial No. 599,372. (No model.)

*To all whom it may concern:*

Be it known that I, SILAS ADAMS, a citizen of the United States, residing at Altoona, in the county of Blair and State of Pennsylvania, have invented a certain new and useful Improvement in Machines for Swaging or Tapering Pipes or Flues, of which the following is a full, clear, and exact description.

The object of this invention is to provide a machine whereby the ends of pipes, flues, or tubes or other tubular bodies may be reduced and tapered, so as to adapt them to be fitted endwise within another pipe, flue, or tube or other object in which they are to be inserted or with which they are to be connected.

For convenience of illustrating my invention I will confine this specification to its use in connection with pipes or tubes which may be brought to a red heat in order to be subjected to the action of the machine which forms the subject of the present invention.

The invention consists of a series of jaws of substantially the construction presently set forth and means whereby they may be contracted about the end of a pipe, tube, or flue, which has been brought to a red heat, in such manner that the portion of the pipe subjected to the action of the jaws will be swaged or tapered, all as I will proceed now more particularly to set forth and finally claim.

In the accompanying drawings, illustrating my invention, in the several figures of which like parts are similarly designated, Figure 1 is a top plan view of sufficient of my invention to illustrate its construction and operation. Fig. 2 is a partly sectional side elevation with the parts in the same position as shown in Fig. 1. Fig. 3 is a vertical section with the parts shown closed or contracted about the end of a pipe to taper the same. Fig. 4 is an end view of the active end of the machine with the jaws open, as in Figs. 1 and 2. Fig. 5 is a view similar to Fig. 4, with the jaws closed, as in Fig. 3.

The bed-plate $a$, of any suitable construction, and adapted to be bolted or otherwise secured to a suitable support, is provided with a stand $b$, rising therefrom perpendicularly and having a horizontal projection or arm $c$. The outer end of this arm $c$ is reduced to form the spindle $d$. Jaws $e$ (in the instance shown there are four such jaws) are pivoted to the spindle $d$ by means of knuckle-joints $f$, and these jaws, in their general outline, are obtuse angles, the knuckles being located substantially at the apexes of the angles, thus constituting levers of the first order. The jaws, both externally and internally, are segments of a circle; and the inner surfaces of the outer ends of the jaws are recessed at $g$ to a depth sufficient to admit the diameter of pipe, tube, or flue to be acted upon to the inner ends of such recesses when the jaws are open, as in Figs. 1 and 2, so that when the jaws are closed down upon the pipe, as in Fig. 3, that portion of the pipe that is within the jaws will be reduced in diameter on a uniform taper, so as to give to that end of the pipe the conformation of a truncated cone.

The bases of the angles, that is to say, the outer surfaces of the jaws $e$, present two inclines, at opposite ends, which are acted upon by a sliding collar $h$ positively to open and close the said jaws. This collar $h$ encircles the jaws and is capable of sliding back upon the arm $c$, and its motion may be effected in any suitable manner, as, for example, by the forked yoke $i$, which is connected with the lever $k$, the latter being pivoted to the bed $a$ in any suitable manner.

The operation will be understood by the description already given, but it may be observed that when the collar $h$ is slid back, as in Figs. 1 and 2, its end nearest to the stand $b$, that is to say, its rear end, will act upon the rear inclines of the jaws, and its forward end will recede from and release the forward inclines of the jaws, and thereby the jaws will be tilted upon their knuckles, so as to cause their rear ends to hug the spindle $b$ while their forward ends separate or diverge from one another, a condition herein referred to as the open condition of the jaws. If now a pipe, tube, or flue be heated, say, to a red heat, and such heated end be inserted within the open jaws, and thereafter the collar $h$ be moved outwardly, as in Fig. 3, such outer ends of the jaws will be closed down upon the tube and contract or taper it, as before described.

By the construction described, which obviously admits of considerable variation, a very simple and economical device is provided for tapering the ends of tubes and the like.

Inasmuch as the collar $h$ may be slipped backwardly to an extent sufficient to clear the jaws, such jaws may be removed and jaws of other conformation or other size for acting upon different kinds or sizes of pipes, &c., may be substituted.

Referring to the yoke, it will be observed that it is shown as rigidly connected with the collar and guided upon projections $l$ from the stand and has a slotted connection with the lever $k$ in order to provide the necessary flexibility and motion; but I wish to be understood as not limiting the invention to such connection and to such arrangement.

The motive power may be manual or mechanical.

The outer edges of the jaws preferably are beveled and come closely together when closed, so as to clip off any metal that may be squeezed through.

It will be understood, of course, that when the jaws are closed the opening or cavity therein is of taper form, with its lines converging toward the rear of the machine.

The number, size, and shape of the jaws may be varied at pleasure to suit the work to be done by the machine.

What I claim is—

1. A machine for tapering the ends of pipes and other tubular objects, comprising a series of jaws of the general outline of obtuse angles, and formed internally and externally as segments of a circle, having their outer ends recessed to form an internal tapering chamber, a spindle upon which said jaws are pivoted by knuckle-joints arranged at the apexes of the angles of the said jaws, and a sliding collar embracing the said jaws, and means to slide said collar longitudinally of the jaws to open and close them, substantially as described.

2. A machine for taper-swaging the ends of pipes and other tubular objects, comprising a series of jaws of the general outline of an obtuse angle, having their outer ends formed with an internally-tapered chamber, and having on their backs, opposite inclines, a spindle upon which the said jaws have a vibratory motion, and a sliding collar applied to the backs of the jaws and adapted to cooperate alternately with the opposite inclines of the said backs of the said jaws, respectively to open and close the said jaws, substantially as described.

3. A machine for taper-swaging the ends of pipes and other tubular objects, comprising a stand, a spindle mounted thereon, a series of jaws pivoted to said spindle and having a vibratory motion thereon, a sleeve encircling the said jaws, a yoke connected to the said sleeve, and a lever connected to the yoke and adapted to move the yoke longitudinally, thereby to impart to the sleeve a sliding motion relatively to the jaws, to open and close the jaws, the outer or active ends of the said jaws forming a cavity to receive the end of the tubular object to be tapered, and adapted to be closed on said object to effect the tapering thereof, substantially as described.

In testimony whereof I have hereunto set my hand this 17th day of June, A. D. 1896.

SILAS ADAMS.

Witnesses:
J. BANKS KURTZ,
CLYDE E. BROWN.